(12) United States Patent
Chatterjee et al.

(10) Patent No.: US 8,055,878 B2
(45) Date of Patent: Nov. 8, 2011

(54) METHOD AND STRUCTURE FOR SKEWED BLOCK-CYCLIC DISTRIBUTION OF LOWER-DIMENSIONAL DATA ARRAYS IN HIGHER-DIMENSIONAL PROCESSOR GRIDS

(75) Inventors: Siddhartha Chatterjee, Yorktown Heights, NY (US); John A. Gunnels, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 1688 days.

(21) Appl. No.: 11/052,216

(22) Filed: Feb. 8, 2005

(65) Prior Publication Data
US 2006/0179267 A1 Aug. 10, 2006

(51) Int. Cl.
*G06F 15/00* (2006.01)
(52) U.S. Cl. .......................................... 712/10
(58) Field of Classification Search ............... 712/10
See application file for complete search history.

(56) References Cited

U.S. PATENT DOCUMENTS 4,065,808 A * 12/1977 Schomberg et al. ............ 712/13
5,450,313 A 9/1995 Gilbert et al.

OTHER PUBLICATIONS

M. Seetha Lakshimi & Philip S. Yu, Effect of Skew on Join Performance in Parallel Architectures, 107-120 (1988).*
Sivan Toledo, et al., "The Design and Implementation of Solar, a Portable Library for Scalable Out-of-Core Linear Algebra Computations", IBM T.J. Watson Research Center.

* cited by examiner

*Primary Examiner* — Eddie P Chan
*Assistant Examiner* — John Lindlof
(74) *Attorney, Agent, or Firm* — McGinn IP Law Group, PLLC

(57) ABSTRACT

A method and structure of distributing elements of an array of data in a computer memory to a specific processor of a multi-dimensional mesh of parallel processors includes designating a distribution of elements of at least a portion of the array to be executed by specific processors in the multi-dimensional mesh of parallel processors. The pattern of the designating includes a cyclical repetitive pattern of the parallel processor mesh, as modified to have a skew in at least one dimension so that both a row of data in the array and a column of data in the array map to respective contiguous groupings of the processors such that a dimension of the contiguous groupings is greater than one.

20 Claims, 9 Drawing Sheets

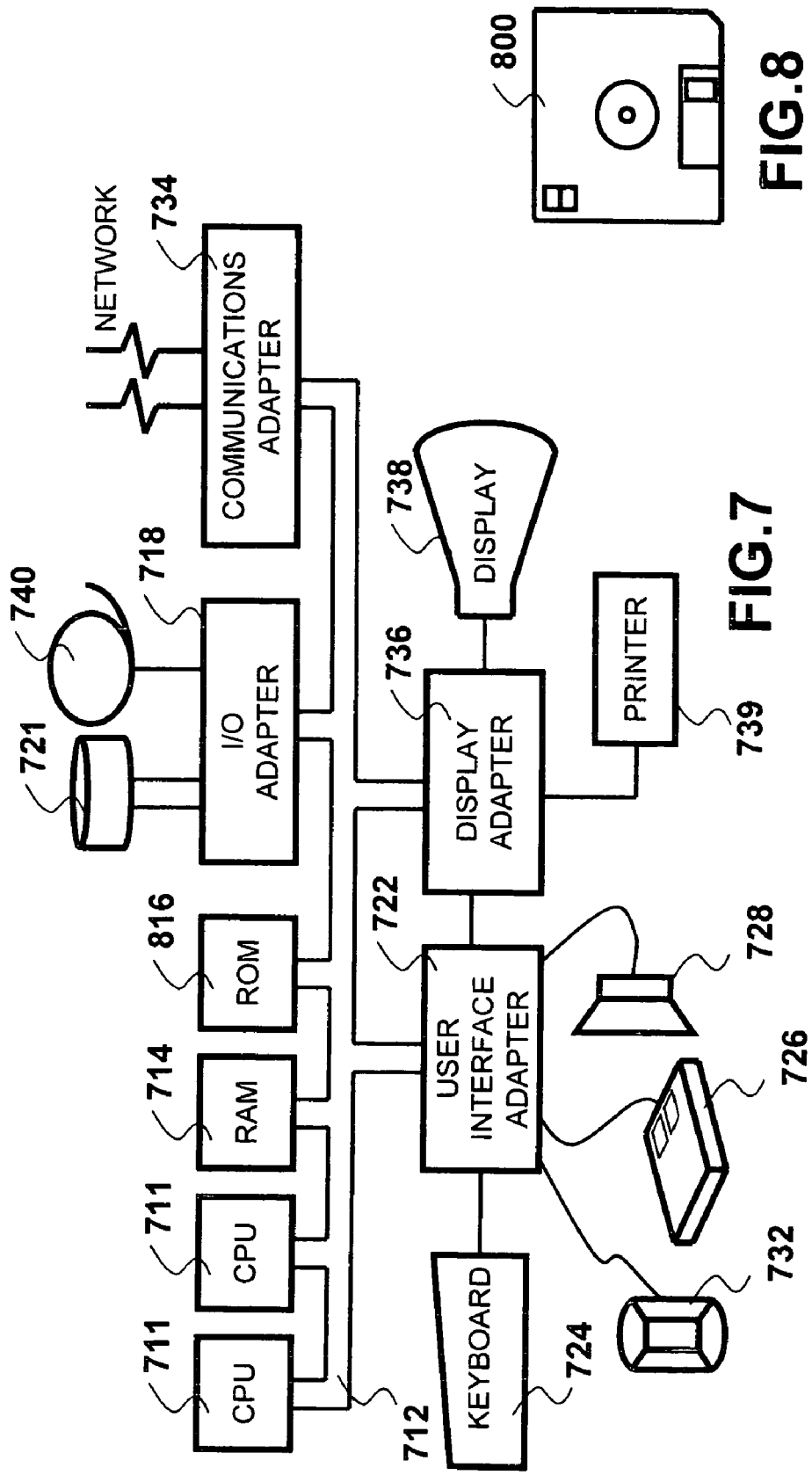

METHOD AND STRUCTURE FOR SKEWED BLOCK-CYCLIC DISTRIBUTION OF LOWER-DIMENSIONAL DATA ARRAYS IN HIGHER-DIMENSIONAL PROCESSOR GRIDS

U.S. GOVERNMENT RIGHTS IN THE INVENTION

This invention was made with Government support under Contract No. Blue Gene/L B517552 awarded by the Department of Energy. The Government has certain rights in this invention.

BACKGROUND OF THE INVENTION

1. Field of the Invention

The present invention generally relates to a method developed to overcome a problem of processing imbalance noted in Assignee's newly-developed Blue Gene/L™ (BG/L) multi-processor computer. More specifically, introduction of a skew term in a distribution of contiguous blocks of array elements permits spreading the workload over a larger number of processors to improve performance.

2. Description of the Related Art

A problem addressed by the present invention concerns the design of the Assignee's new Blue Gene/L™ machine, currently considered the fastest computer in the world. The interconnection structure of the Blue Gene/L™ machine is that of a three-dimensional torus.

Standard block-cyclic distribution of two-dimensional array data on this machine, as is normally used in the LIN-PACK benchmark (a collection of C routines that are used to solve a set of dense linear equations), causes an imbalance, as follows: If an array (block) row is distributed across a contiguous plane or subplane of the physical machine (a two-dimensional slice of the machine), then an array (block) column is distributed across a line in the physical machine (e.g., a one-dimensional slice of the machine), as can be seen in FIGS. 5A and 5B, to be discussed after an understanding of the block-cyclic distribution of two-dimensional array data is presented in the following discussion.

This distribution results in critical portions of the computation (namely, the panel factorization step) being parallelized across a much smaller part of the machine, and in certain broadcast operations, having to be performed alone a line of the machine architecture, such as a row or column of processors, rather than planes.

Altering the data mapping to allow rows and columns to occupy greater portions of the physical machine can improve performance by spreading the critical computations over a larger number of processors and by allowing the utilization of more communication "pipes" (e.g., physical wires) between units performing the processing.

Although on-the-fly re-mapping/re-distribution of the data could provide one possible solution to this problem, this solution has the disadvantages of requiring time and space to re-map data, and the resulting code is more complex. Replicating the array is another possible solution, but the cost of this solution is the multiple copies of the data, the memory consumed, and the complexity of keeping the copies consistent.

Thus, a need exists to overcome this problem on three-dimensional machines, such as the BG/L™, as identified by the present inventors, in a manner that avoids these disadvantages of time and space requirements and code complexity.

SUMMARY OF THE INVENTION

In view of the foregoing, and other, exemplary problems, drawbacks, and disadvantages of the conventional systems, it is an exemplary feature of the present invention to provide a structure (and method) in which critical computations are spread statically over a larger number of processors in a parallel computer having a three-dimensional interconnection structure.

It is an exemplary feature of the present invention to provide a method in which both rows and columns of a matrix can be simultaneously mapped to planes (or subcubes, or other higher-dimensional object) of a three-dimensional machine.

It is another exemplary feature of the present invention to achieve this feature in a manner that avoids the disadvantages that would be required for a technique of dynamic re-mapping/re-distribution of data, such as time and space for re-mapping data and the more complex code that would be required to implement such technique.

To achieve the above, and other, exemplary features, in a first exemplary aspect of the present invention, described herein is a method of distributing elements of an array of data in a computer memory to a specific processor of a multi-dimensional mesh of parallel processors, including designating a distribution of elements of at least a portion of the array to be executed by specific processors in the multi-dimensional mesh of parallel processors, a pattern of the designating comprising a cyclical repetitive pattern of the parallel processor mesh, as modified to have a skew in at least one dimension so that both a row of data in said array and a column of data in said array map to respective contiguous groupings of said processors such that a dimension of said contiguous groupings is greater than one.

In a second exemplary aspect of the present invention, also described herein is computer, including a memory storing an array of data for processing and a plurality of processors interconnected in parallel for processing the data in the array, wherein at least a portion of the data in the array is designated in a predetermined distribution pattern of elements of the array to be executed by specific processors in the plurality of processors, the predetermined distribution pattern comprising a cyclical repetitive pattern of the plurality of parallel processors, as modified to have a skew in at least one dimension so that both a row of data in said array and a column of data in said array map to respective contiguous groupings of said processors such that a dimension of said contiguous groupings is greater than one.

In a third exemplary aspect of the present invention, also described herein is a signal-bearing medium tangibly embodying a program of machine-readable instructions, executable by a digital processing apparatus comprising a plurality of processors, to distribute elements of an array of data in a computer memory to be executed by specific processors in said plurality of processors in the manner described above.

In a fourth exemplary aspect of the present invention, also described herein is a method of executing a linear algebra processing, including loading a set of machine-readable instructions into a section of memory of a computer for execution by the computer, wherein the set of machine-readable instructions causes the computer to designate a distribution of elements of at least a portion of an array of data to be executed by specific processors in a multi-dimensional mesh of parallel processors in the manner described above.

The data mapping of the present invention allows both rows and columns to simultaneously occupy greater portions of the physical machine to thereby provide the advantage of improving performance by spreading the critical computations over a larger number of processors and by allowing communication among the set of processors upon which the rows/columns reside to utilize more physical links, resulting in improved communication performance.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 3 also shows which array blocks are designated to be processed in the present invention by processors (0,0,0), (0,0,1) and (0,1,0);

FIG. 7 illustrates an exemplary hardware configuration 700 for incorporating the present invention therein; and FIG. 8 illustrates a signal bearing medium 800 (e.g., storage medium) for storing steps of a program of a method according to the present invention.

DETAILED DESCRIPTION OF AN EXEMPLARY EMBODIMENT OF THE INVENTION

Figure 1:
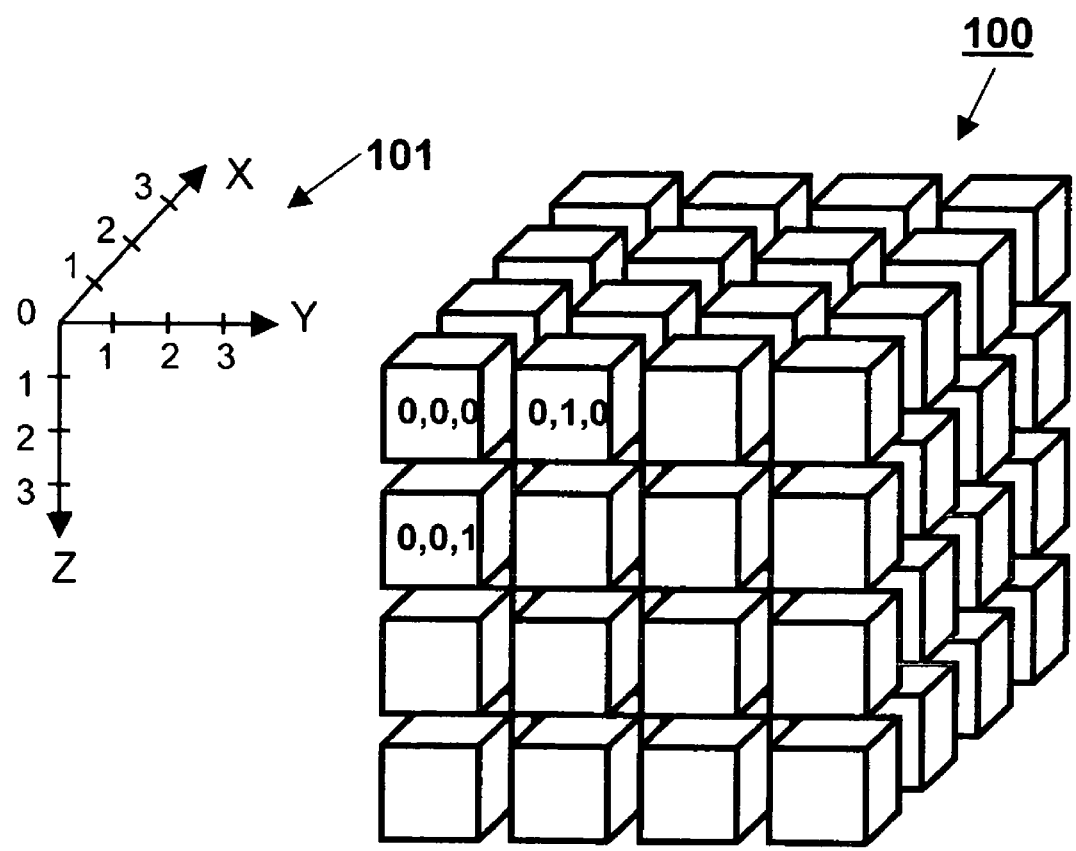
FIG. 1 shows a 4×4×4 three-dimensional mesh of an exemplary 64-processor machine 100 used to discuss the present invention.

Referring now to the drawings, and more particularly to FIGS. 1-8, an exemplary embodiment of the present invention will now be described.

FIG. 1 exemplarily shows 64 processors in a parallel processing machine, as interconnected in a three-dimensional mesh in the format of a 4×4×4 cube of processors 100. The BG/L machine currently has many more than the 64 nodes shown in the FIG. 1 mesh 100, but the 64-node configuration 100 of FIG. 1 suffices for explaining the concepts of the present invention, since it should be apparent that it would be straightforward to increase or decrease the dimensions of the three-dimensional processor mesh 100 in any dimension X, Y, Z.

Figure 2:
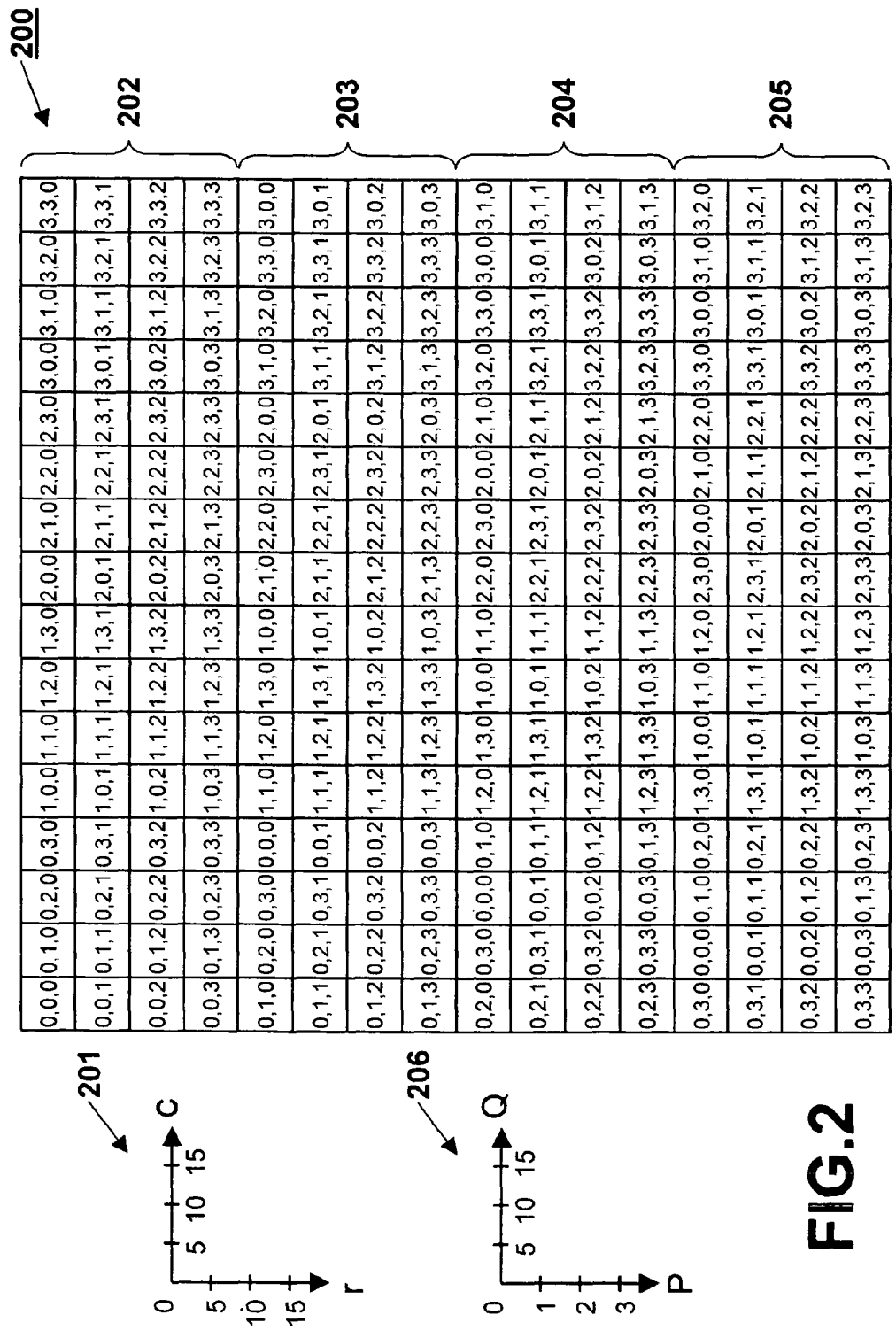
FIG. 2 exemplarily shows a 16×16 block data array 200 that is to be distributed to the three-dimensional machine 100, including the logical machine symbology (x,y,z) that identifies which processor in the three-dimensional machine 100 is designated for the processing of each array block. Each of the 16×16 array elements might be a single datum, or, more typically, each element is actually a block of data of size D×E, for example, a 10×10 block of data.

FIG. 2 exemplarily shows a 16×16 mathematical array 200 intended to be processed by the 4×4×4 mesh of processors 100 for discussion of the present invention. Again, it should also be apparent that the specific size of the array 200 is only exemplary and non-limiting. It is also noted that each element represented in array 200 is typically a block of data, so that array 200 would typically represent a 16×16 block array.

The coordinate numbers (x,y,z) within each block correspond to the specific processor x,y,z in the 4×4×4 machine that is exemplarily designated to execute the data in that array block. Thus, by including the designated processor nodes, the array 200 demonstrates the two-dimensional-to-three-dimensional mapping between the array elements and the three-dimensional mesh of processors 100.

Coordinate axes (r,c) 201 applies to the rows and columns of the 16×16 block array 200. It is noted that each increment of four rows 202, 203, 204, 205 corresponds to an entirety of the 4×4×4 processor core 100, so that each four-row increment 202, 203, 204, 205 can be considered as being a logical machine of size 4×16. Coordinate axes (P,Q) 206, therefore, can apply to each logical machine having four rows P and sixteen columns Q.

However, because the present invention incorporates a skew factor in one of the dimensions in the mapping between the two-dimensional block array and the three dimensional processor core 100, beyond the first logical machine 202, a more efficient tracking of the mapping is provided in the generic equations discussed later.

As mentioned, although each array element can nominally be a single datum, more typically, large arrays of data are processed by subdividing the large array of data into blocks (e.g., each block might be 10×10), and processing the array in units of these blocks. Thus, FIG. 2 shows which designated processor (x,y,z) would process the data in the array block of size D (e.g., 10×10).

Figure 3:
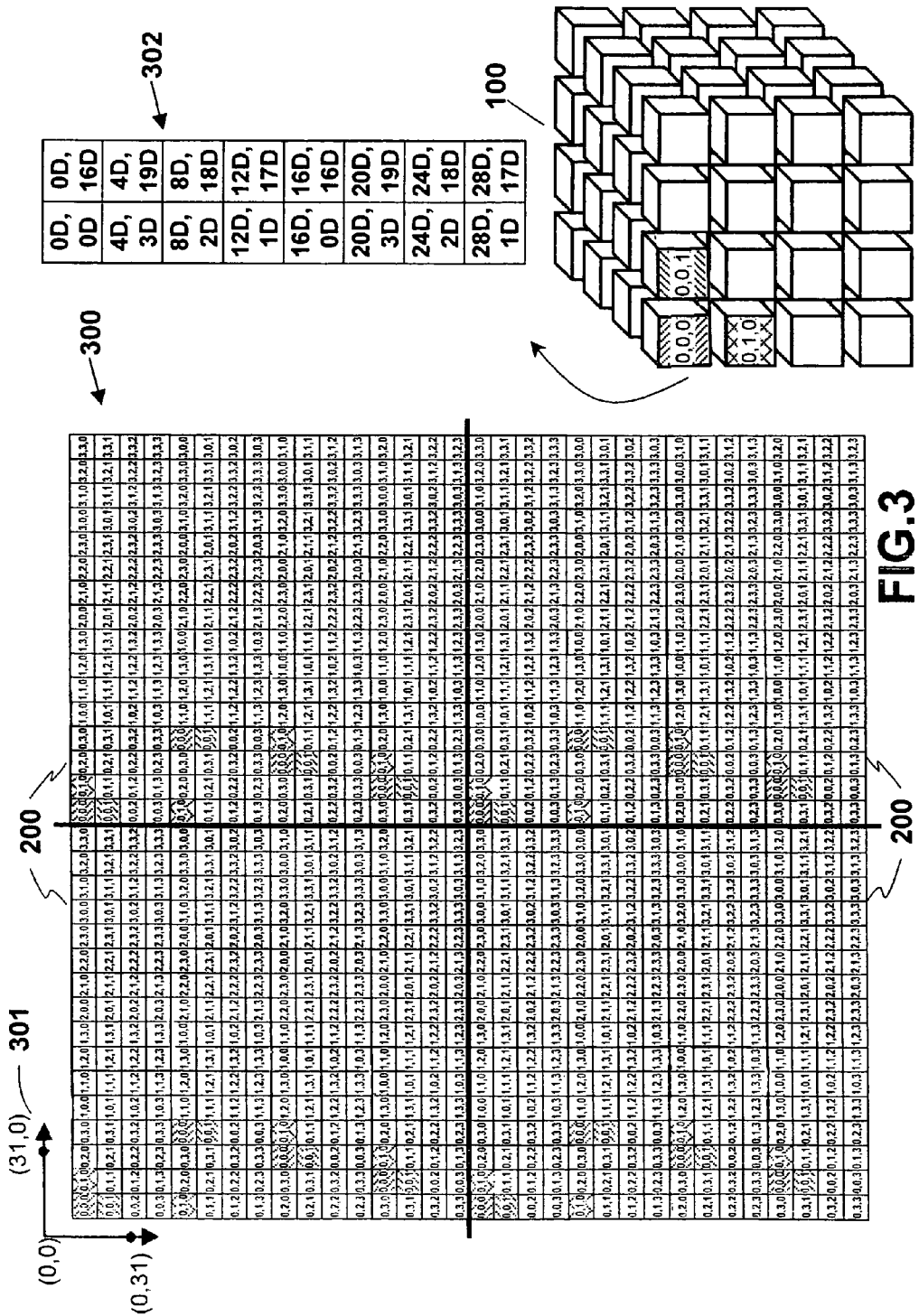
FIG. 3 shows how the basic 16×16 pattern 200 can be repeatedly tiled to cover larger sized arrays such as a 32×32 block array 300.

FIG. 3 shows how the exemplary basic uniform distribution pattern 200 can be superimposed on a larger array 300 by tiling the 16×16 pattern 200 over the larger array of data, such as the four repetitions 200 shown in the figure, resulting in a coordinate axes (r,c) 301 double in size from the coordinate axes (r,c) 201 shown in FIG. 2.

The standard one-dimensional block-cyclic distribution deals out contiguous blocks of array elements to consecutive processors in a round-robin fashion. The standard multi-dimensional block-cyclic distribution is the Cartesian product of individual one-dimensional block-cyclic distributions.

In contrast to simple two-dimensional block-cyclic distribution, the present invention augments simple block-cyclic distribution to incorporate a "skew" in at least one dimension. This skew achieves symmetry between the distribution of array rows and columns in the physical machine, while maintaining simplicity of local-to-global and global-to-local address translation.

Thus, in the exemplary embodiment described by the figures, instead of using a simple two-dimensional block-cyclic distribution, wherein wrapping occurs uniformly in two dimensions, in the present invention, the wrapping in the second dimension has a "skew."

This two-dimensional skewing is readily apparent in the logical machine 200 shown in FIG. 2 by noting the pattern that recurs throughout the 16×16 logical machine 200 in each 4×4. That is, by comparing the upper four rows 202 with the four rows 203 immediately below and noting that, not only is there a skewing occurring in each 4×4 block, there is also a secondary skewing occurring between the first level 202 and the second level 203, and this inter-level skewing occurs throughout the four levels 202, 203, 204, 205.

The conventional method of wrapping in two dimensions would be represented by having the upper four rows 202 repeated to be each of the four levels 202, 203, 204, 205 shown in FIG. 2. The conventional two-dimensional wrapping, having no skew, can be seen in the lower portion of FIG. 5B, for comparison with FIG. 2.

Therefore, for sake of discussion, it is assumed that a physical processor grid is represented by X×Y×Z (e.g., the 4×4×4 grid 100 shown in FIG. 1). As shown in FIG. 2, the logical grid 202, 203, 204, 205 is assumed to be P×Q, with P=Z and Q=X×Y (e.g., P=4, Q=4×4=16). Physical processor (x, y, z) corresponds to logical processor (z, x.Y+y).

In a standard block-cyclic distribution of an N×N array on the P×Q logical grid of processors with distribution block size D in each grid dimension, array element (i,j) maps to logical processor (i div D mod P, j div D mod Q). It is noted that this example is simplified, and could easily be extended to an M×N array with different distribution block sizes for the two grid dimensions.

A consequence of this data distribution is that the logical processor holding block (R, C) also holds blocks (R+P, C), (R+2P, C), etc. When mapped back to the physical processor grid, the set of blocks with a common column index maps onto a single line of processors.

In an exemplary embodiment of the present invention, a "skew" is applied in one of the factors of the Q dimension (say, X), so that processor holding block (R, C) also holds blocks (R+P, C−1), (R+2P, C−2), etc. A consequence of this variation, for an appropriately chosen value of the skew, is that the set of blocks with a common column index maps to a plane of the physical processor grid.

Figure 4:
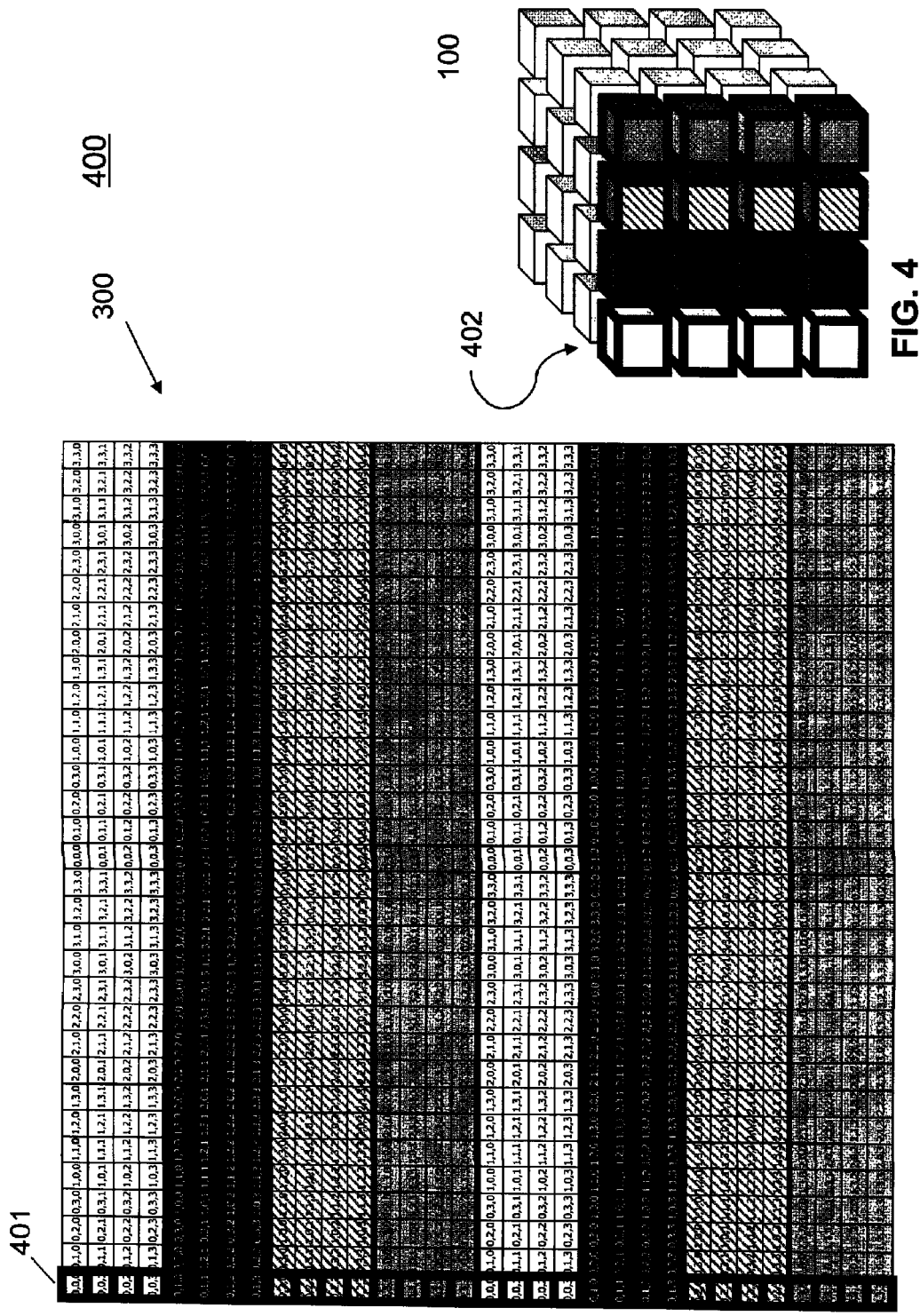
FIG. 4 demonstrates how elements of an array column 401 of the 2D array 300 are distributed into plane 402 of the three-dimensional processor grid 100, when an appropriate skew is introduced in the Q dimension in accordance with the present invention.
Figure 5:
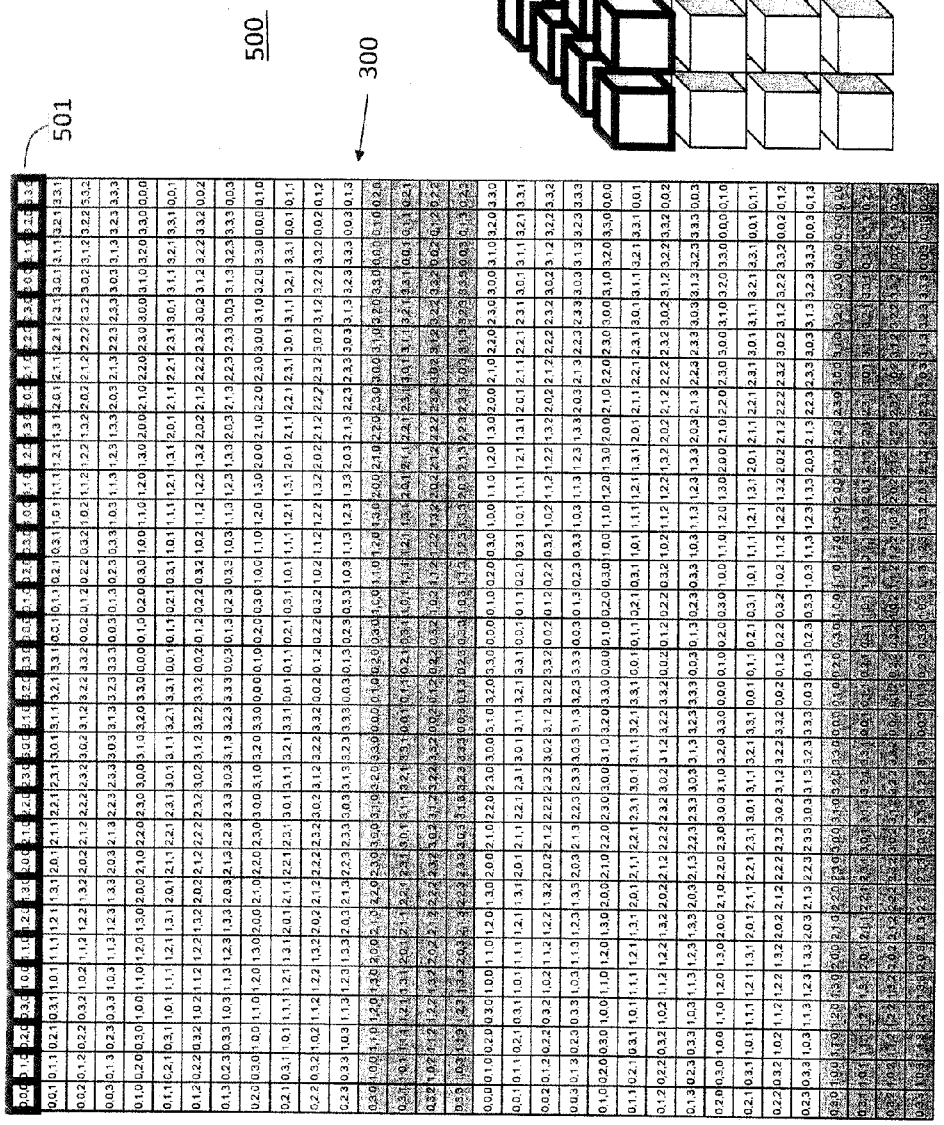
FIG. 5 demonstrates how elements of an array row 501 of the two-dimensional array 300 are distributed into plane 502 of the three-dimensional processor grid 100, with the skew in the Q dimension in accordance with the present invention.

This effect can be seen in FIG. 4, wherein it is shown how elements of an array column 401 are distributed into plane 402 of the 4×4×4 mesh 100, and in FIG. 5, wherein elements of an array row 501 are distributed into plane 502. It is noted that this distribution also shows up in FIG. 2 and FIG. 3 by simply noting that the designated processor (x,y,z) of each row is constant in z and is constant in x for each column, each condition signifying, respectively, either a z-plane or an x-plane in the 3D processor mesh 100, when it is realized that all processors of a plane is involved for both rows and columns.

FIG. 3 also shows the distribution of data blocks that are distributed respectively to processors (0,0,0), (0,0,1), and (0,1,0). Table 302 provides the listing of blocks for processor (0,0,0), as listed using the coordinate axis for the rows and columns of the 32×32 array 300. Thus, table 302 shows which parts of the matrix (a two-dimensional mathematical object, which, in a programming language, is a two-dimensional array object) will reside on processor (0,0,0) in the 4×4×4 physical processor (three-dimensional) system 100.

The "D" in the object in table 302 is intended to indicate that the "value" in the 32×32 array might be a block of numbers instead of a single floating point number (a contiguous set of numbers from the original object), as previously mentioned. For example, a 320×320 array might be depicted as a 32×32 array where D=10, such that each array element is, in fact, a 10×10 block of floating point numbers.

From FIG. 4 and FIG. 5, it can clearly be seen that a key advantage of the present invention is that both rows and columns of a matrix simultaneously map to planes of the three-dimensional machine without replication. With appropriate skewing, the rows and columns could map to subcubes or other higher-dimensional object, rather than to planes.

Figure 5A:
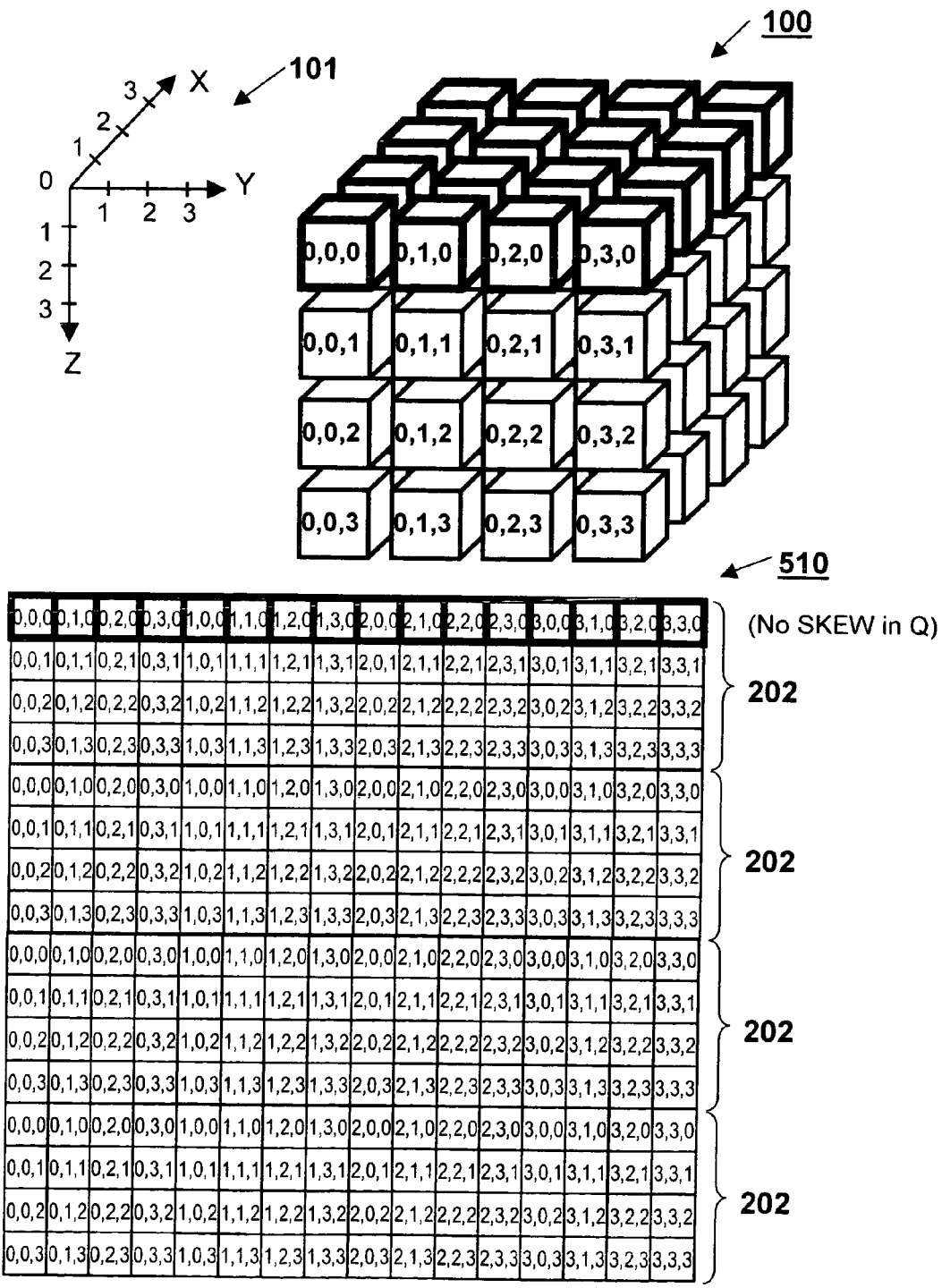
FIGS. 5A and 5B show the comparison of the distribution of a 16×16 block array 510 on the 4×4×4 processor grid 100, if conventional two-dimensional block-cyclic distribution without skewing in the Q dimension were used.
Figure 5B:
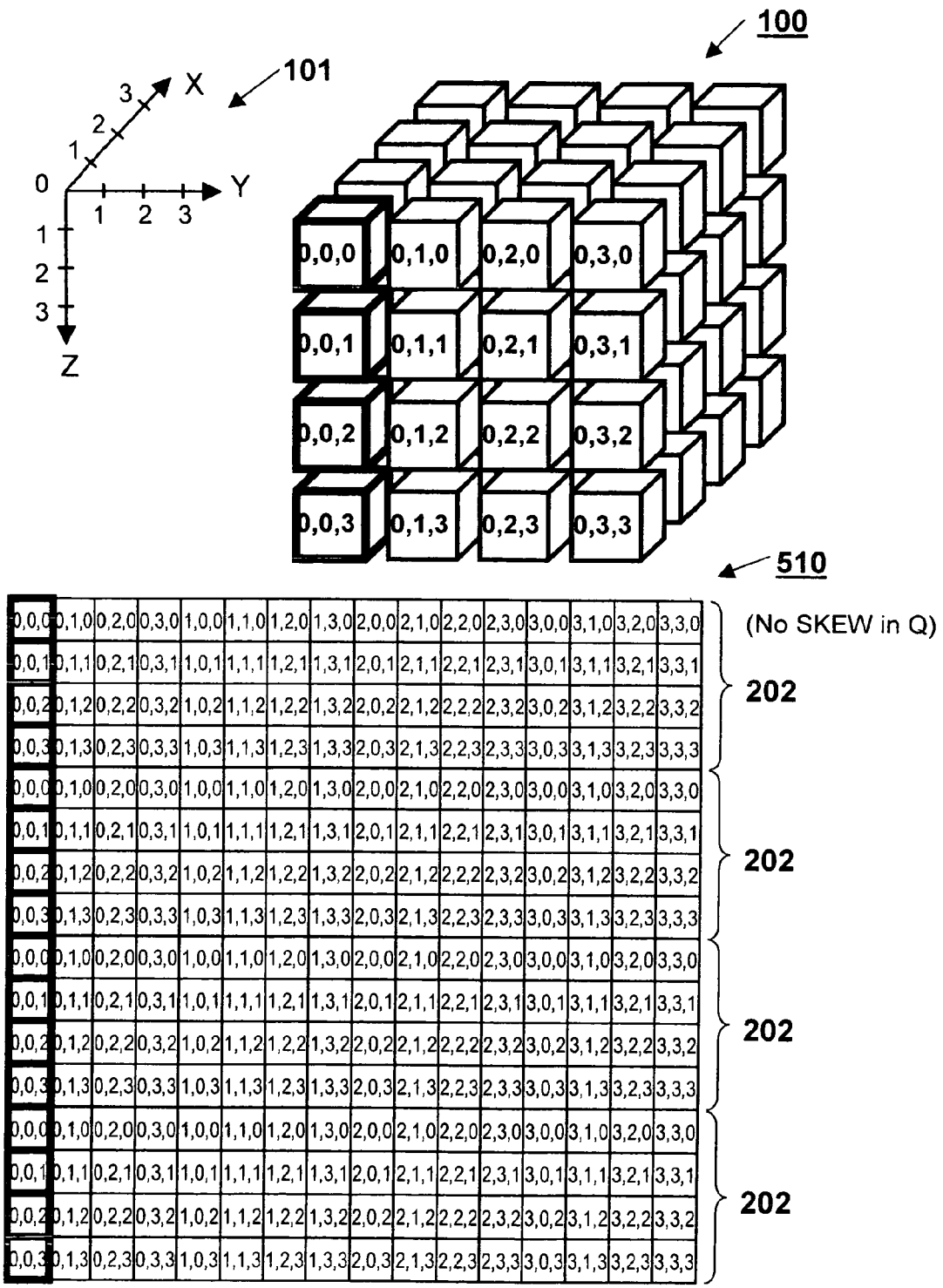

Typically, using standard block-cyclic mapping without the skewing of the present invention, one can map rows OR columns to a plane of the array, not both rows AND columns, as shown in FIGS. 5A and 5B for an array 510 of size 16×16.

Figure 6:
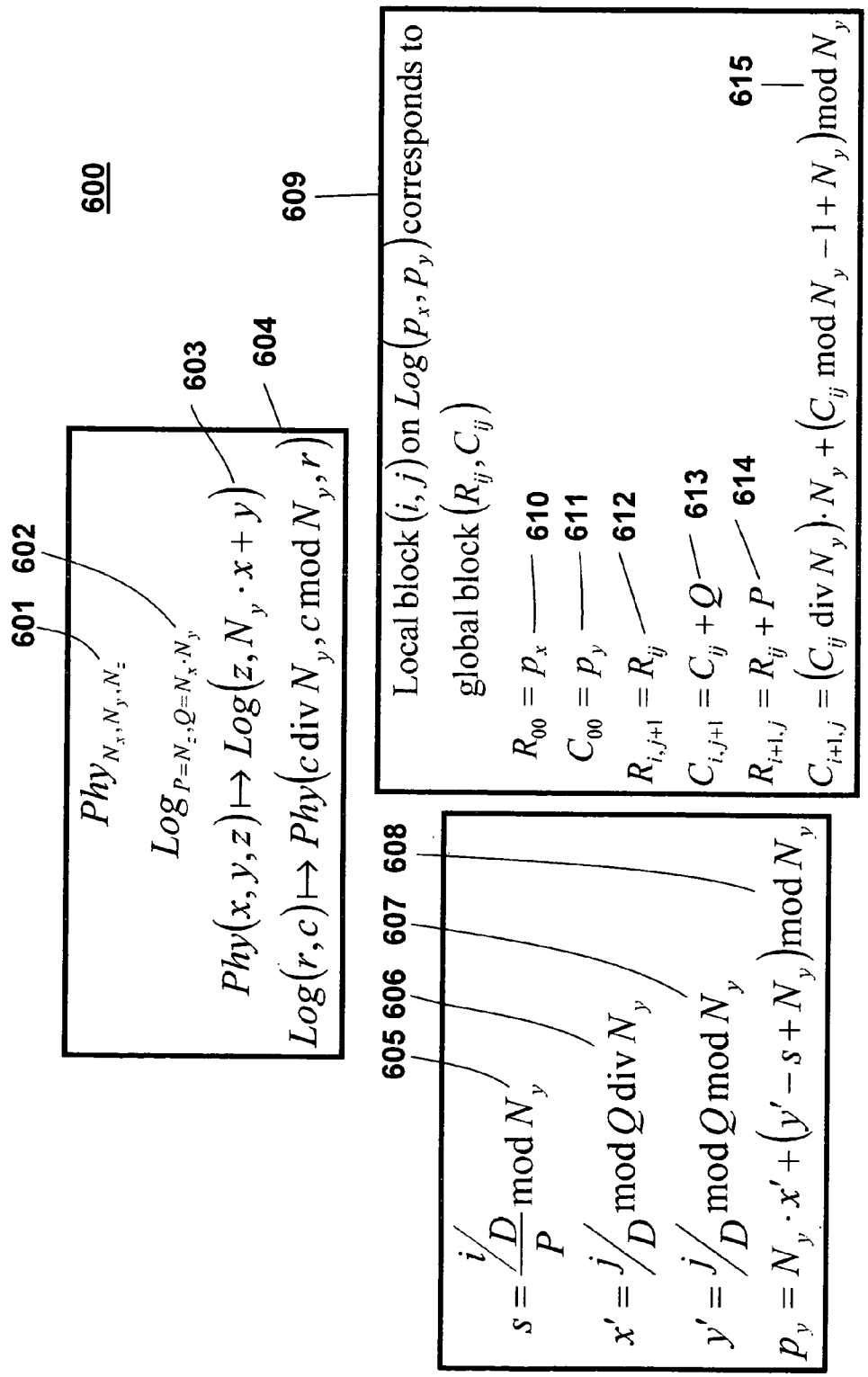
FIG. 6 shows the equations that apply the concepts of the present invention in a generic manner.

FIG. 6 shows symbology and various equations 600 applicable for generically expanding the concepts of the present invention beyond the relatively simple 4×4×4 example.

Symbology 601 refers to the entire (sub)cube of processors under consideration, which was a 4×4×4 cube in the example. It is noted that, although a cube provides a simpler example, that the shape of the processor mesh is not necessarily limited to a cube and might be, for example, rectangular. It is noted that it is also possible to expand the three-dimensional processor core concept to higher dimensions, such as a four-dimensional space, by adding at least one more 4×4×4 cube of processors and considering each 4×4×4 cube as being one point in a $4^{th}$ dimensional space.

Symbology 602 corresponds to the size of the logical grid. In the example, Nx, Ny, and Nz are all 4, so that the number of rows in the logical grid (P) is 4 and the number of columns in the logical grid (Q) is 16.

Symbology 603 represents the Phy→Log mapping (e.g., physical-to-logical) for the first strip (ie, the upper logical grid).

Symbology 604 represents the Log→Phy mapping for the upper strip, when "c" is considered as the column, "r" is considered as the row, and Ny=4, as would correspond to the coordinate axes 206 on FIG. 2, and where "r" and "c" correspond to coordinates on the P and Q axis, respectively, and "div" refers to the "floor" or integer resulting from the division and "mod" refers to the modulus (remainder) operation.

In Equation 605, the term "s" denotes "skew." The term "i" stands for the row in the logical matrix (the mathematical object, not the machine). "D" is meant to indicate the "block size" of data previously mentioned. In the example, only square blocks of size D×D (e.g., 10×10 where D=10) were considered, but it would be straightforward to extend the block to rectangular shape (e.g., D×E blocks, where D≠E).

"P" is the number of processor rows in the logical two-dimensional processor grid. The term "i/D" is the integral divide that shows which row block an element is in. As an example, any element whose row dimension is 35, for example, would be in logical block row 3 in the D=10 example (e.g., 35/10=3). It is noted that numbering (e.g., blocks and indices) starts at 0.

Dividing by P indicates which "wrap" this element is in. Elements repeatedly wrap around the P×Q grid. For example, on a 4×16 logical grid, elements whose row coordinates are 103 would be in block 11 (113/10=11), and would be in the wrap 2 (11/4=2).

In Equation 606, "div" means "floor" (e.g., the integer resultant from the division). The result of "j/D mod Q" is the "logical" processor column in which element j will appear. The result "j/D" is the block number, and "mod Q" tells which logical processor column the block cyclic wrapping would take it to. The additional "div Ny" tells how many multiples of Ny wraps around the logical Q dimension have taken place when this element of the matrix is reached.

Any matrix element is defined by an (i,j) coordinate here. P and Q are the logical processor grid dimensions.

Equation 607 is similar to Equation 606 above, except "mod Ny", rather than "div Ny", is involved. This tells which "equivalence class" of Ny this element would fall into as it is wrapped.

In Equation 608, "Py" identifies the physical processor (y-coordinate) to which the element (i,j) gets mapped, given the values described above.

In the third set of equations, "px" and "py" refer to the logical processor coordinates. That is, px ranges between 0 and P−1 and py ranges between 0 and Q−1.

This third set of equations is a description of the mapping using a recurrence relationship. The first two equations 610, 611 begin the recursive nature in that, on any processor, the first block is the (x,y)th block from the original/global matrix. So, on processor (0,0) [logical], the (0,0) block of the global matrix is the (0,0) block of the local matrix. On processor (12,14) the (0,0) block of the local matrix corresponds to the (12, 14) block of the global matrix.

Equation 612 (e.g., R(i,j+1)=R(i,j)) says that, for any two blocks of the global matrix whose j coordinate differs by 1, their processor row is the same. Alternatively, this equation says that any two blocks whose j coordinate differs (all blocks whose i coordinate is some fixed value) reside in the same processor row.

Equation 613 (e.g., C(i,j+1)=C(i,j+Q)) is similar, except that if their j coordinate differs by Q, the two blocks reside on the same processor column (a later equation shows where they reside if the j coordinate differs by 1).

Equation 614 (e.g., R(i+1,j)=R(i,j+P)) is analogous to the previous line, switching i/j and P/Q.

The final, complex, equation 615 shows where blocks whose global i column coordinate differ by 1 are placed. This is where skewing comes into play.

FIG. 7 illustrates a typical hardware configuration of computer system in accordance with the invention and which has a plurality of processors or central processing units (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

The second exemplary aspect of the present invention additionally raises the issue of general implementation of the present invention in a variety of ways.

For example, it should be apparent, after having read the discussion above, that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS library in accordance with these principles.

It should also be recognized that other variations are possible, such as versions in which a higher level software module interfaces with existing linear algebra processing modules, such as a BLAS or other LAPACK or ScaLAPACK module, to incorporate the principles of the present invention.

Moreover, the principles and methods of the present invention could be embodied as a computerized tool stored on a memory device, such as independent diskette 800, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all of these various methods of implementing and of using the present invention, including that of the end user who indirectly utilizes the present invention by receiving the results of matrix processing done in accordance with the principles herein.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of distributing elements of an array of data in a computer memory to a specific processor of a multi-dimensional mesh of processors operating in parallel, said method comprising:
   designating a distribution of elements of at least a portion of said array to be executed by specific processors in said multi-dimensional mesh of processors,
   a pattern of said designating comprising a cyclical repetitive pattern of said processor mesh, as modified to have a skew in at least one dimension so that both a row of data in said array and a column of data in said array map to respective contiguous groupings of said processors, a dimension of said contiguous groupings being greater than one.

2. The method of claim 1, wherein a dimension of said array of data is at least two and a dimension of said multi-dimensional mesh of processors is at least three.

3. The method of claim 2, wherein said array comprises a two-dimensional array and said multi-dimensional mesh of processors comprises a three-dimensional mesh and said row of array data maps to one plane in said three-dimensional mesh and said column of array data maps to another plane in said three-dimensional mesh.

4. The method of claim 1, wherein said array comprises data for a linear algebra processing.

5. The method of claim 1, wherein said array data comprises uniform blocks of data, each said block being designated as a unit to a specific processor.

6. The method of claim 1, wherein said cyclical repetitive pattern comprises a basic uniform cyclical repetitive pattern for a basic size of said array data and said basic uniform cyclical repetitive pattern is replicated to cover a size of array data larger than said basic size.

7. A computer, comprising:
   a memory storing an array of data for processing; and
   a plurality of processors interconnected in parallel for processing said data in said array,
   wherein at least a portion of said data in said array is designated in a predetermined distribution pattern of elements of said array to be executed by specific processors in said plurality of processors,
   said predetermined distribution pattern comprising a cyclical repetitive pattern of said plurality of parallel processors, as modified to have a skew in at least one dimension so that both a row of data in said array and a column of data in said array map to respective contiguous groupings of said processors, a dimension of said contiguous groupings being greater than one.

8. The computer of claim 7, wherein said array of data comprises a two-dimensional array of data and said plurality of parallel processors comprises a three-dimensional mesh of processors.

9. The computer of claim 8, wherein said array of data comprises a matrix data and said processing comprises a linear algebra processing of said matrix data.

10. The computer of claim 9, wherein said elements of said array of data are designated to said specific processors as two-dimensional blocks of data.

11. The computer of claim 8, wherein said rows of said array and said columns of said array map respectively to planes in said three-dimensional mesh of processors.

12. A machine-readable medium tangibly embodying a program of machine-readable instructions, executable by a digital processing apparatus comprising a plurality of processors, to distribute elements of an array of data in a computer memory to be executed by specific processors in said plurality of processors, said method comprising:
   executing a predetermined distribution pattern comprising a cyclical repetitive pattern of said plurality of parallel processors, as modified to have a skew in at least one dimension so that both a row of data in said array and a column of data in said array map respectively to contiguous groupings of said processors, a dimension of said contiguous groupings being greater than one.

13. The machine-readable medium of claim 12, wherein said array of data comprises a two-dimensional array of data and said plurality of parallel processors comprises a three-dimensional mesh of processors.

14. The machine-readable medium of claim 13, wherein said array of data comprises a matrix data and said processing comprises a linear algebra processing of said matrix data.

15. The machine-readable medium of claim 12, wherein said elements of said array of data are designated to said specific processors as two-dimensional blocks of data.

16. The machine-readable medium of claim 12, comprising a standalone diskette of machine-readable instructions.

17. The machine-readable medium of claim 12, comprising a set of machine-readable instructions stored in a memory of a computer.

18. The machine-readable medium of claim 17, wherein said computer comprises a server in a computer network, said server making said machine-readable instructions available to another computer on said network.

19. A method of executing a linear algebra processing, said method comprising:
   loading a set of machine-readable instructions into a section of memory of a computer for execution by said computer,
   wherein said set of machine-readable instructions causes said computer to designate a distribution of elements of at least a portion of an array of data to be executed by specific processors in a multi-dimensional mesh of parallel processors in said computer, a pattern of said distribution comprising a cyclical repetitive pattern of said parallel processor mesh, as modified to have a skew in at least one dimension so that both a row of data in said array and a column of data in said array map to respective contiguous groupings of said processors, a dimension of said contiguous groupings being greater than one;
   loading matrix data in accordance with said skewed distribution pattern onto said multi-dimensional mesh of parallel processors; and
   executing said linear algebra processing on said data with said skewed distribution pattern.

20. The method of claim 19, wherein said multi-dimensional mesh comprises a three-dimensional mesh of processors and a row of data in said array maps to a plane in said three-dimensional mesh of processors and a column of data in said array maps to a plane in said three-dimensional mesh of processors.

* * * * *